Aug. 27, 1963   F. J. KOELNDORFER   3,101,629
LAWN MOWER SHARPENING DEVICE
Filed Feb. 5, 1962   3 Sheets-Sheet 1

INVENTOR.
FREDERICK J. KOELNDORFER
BY *Hobbs & Easton*
ATTORNEYS

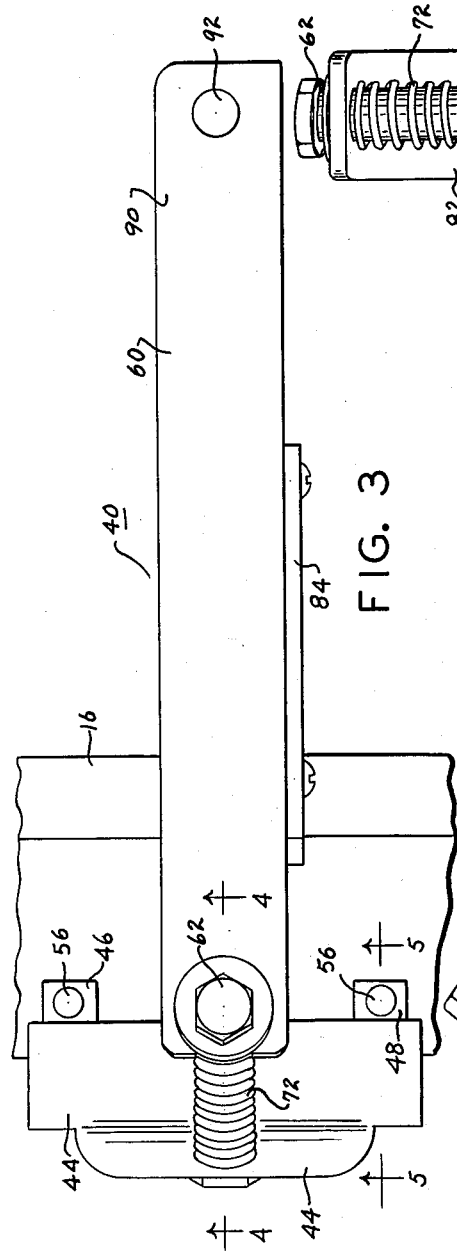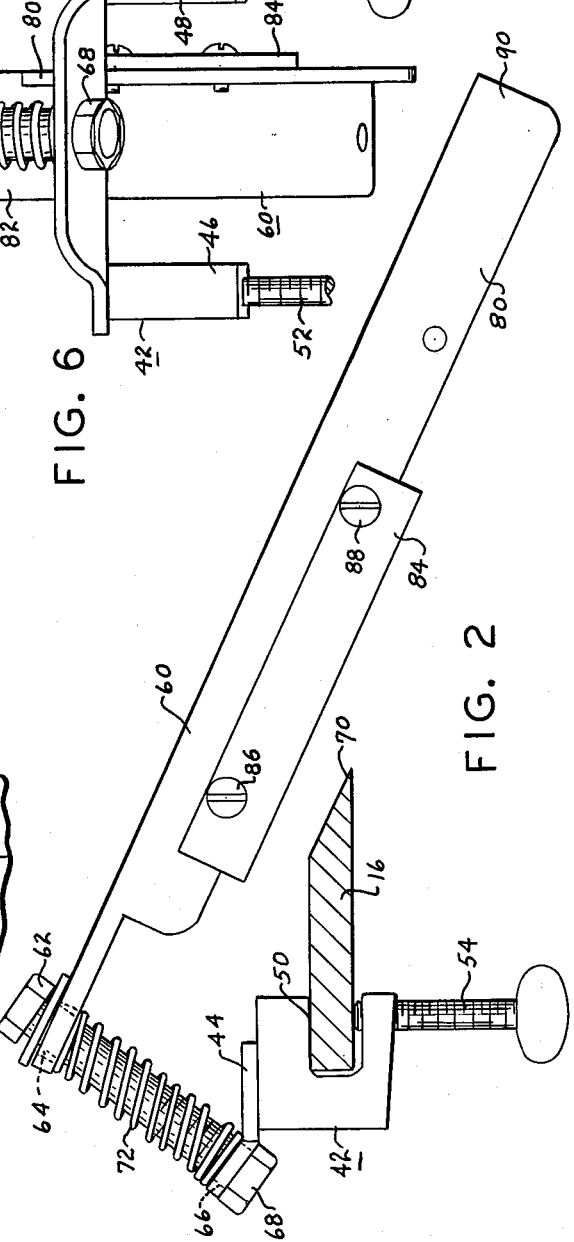

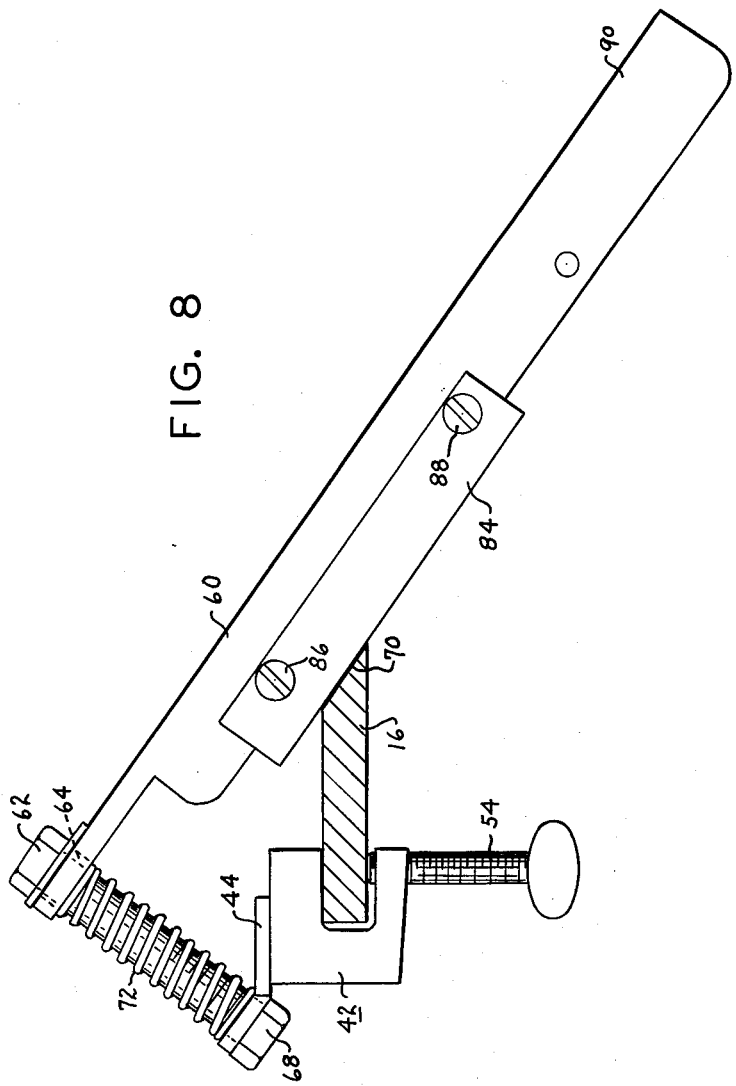

United States Patent Office 3,101,629
Patented Aug. 27, 1963

3,101,629
LAWN MOWER SHARPENING DEVICE
Frederick J. Koelndorfer, 56270 Harman Drive, Mishawaka, Ind.
Filed Feb. 5, 1962, Ser. No. 174,339
3 Claims. (Cl. 76—82.1)

The present invention relates to a lawn mower sharpening device and more particularly to a device for sharpening the blades of rotary lawn mowers.

Power driven rotary lawn mowers are being extensively used in the domestic field where they are operated for only relatively short periods of time, often once or twice a week to mow small lawns or plots. The operator of the mower is frequently careless in the use of the mower in and around objects and in areas which readily dull or nick the mower blade and is usually inexperienced and mechanical untrained to properly sharpen the blades by conventional means and methods consisting in removing the blades from the mower, filing or grinding the cutting edge and then replacing the blade on the mower. Further, handling the blades in performing the conventional sharpening operation is often hazardous, particularly when the blade is being removed from and replaced on the mower. Also filing and grinding the removed blades often result in uneven sharpening and unbalancing the blades so that when the blades are reassembled on the mower and operated, a substantial amount of vibration results. It is therefore one of the principal objects of the present invention to provide a device for sharpening the blades of rotary mowers, which can effectively sharpen the cutting edge of the blades without the necessity of removing the blades from the mower and without encountering any difficulty in holding the blade in position while performing the operation.

Another object of the present invention is to provide a device for sharpening the blades of rotary mowers, which can be used at any convenient place with only momentary interruption of the mowing operation and without the use of any tools or special skills in performing the sharpening operation.

Still another object of the invention is to provide a lawn mower sharpening device of the aforesaid type which can readily be rigidly clamped into a fixed position on the mower blade and operated in a prescribed manner to obtain the optimum cutting edge.

A further object is to provide a relatively simple device which can be easily installed on a mower blade in operating position and manipulated by a simple swinging motion to perform the sharpening operation and which can be readily adjusted to fit the blades of all standard or conventional rotary mowers.

Another object of the invention is to provide a small, compact and sturdy blade sharpening device for lawn mowers having an easily replaceable, inexpensive metal cutting means for sharpening the blade and including only one principal moving part for performing the sharpening operation.

Additional objects and advantages of the present invention will become apparent from the following description and accompanying drawings, wherein:

FIGURE 2 is a side elevational view of the present sharpening device showing the device mounted in position on a blade of a rotary mower ready to sharpen the blade;

FIGURE 3 is a top plan view of the sharpening device shown in the preceding figures showing the device mounted on the blade of the mower;

FIGURE 6 is an elevational view of one end of the blade sharper shown in the preceding figures.

FIGURE 8 is another side elevational view of the device showing it in operative position on the blade.

Figure 1:
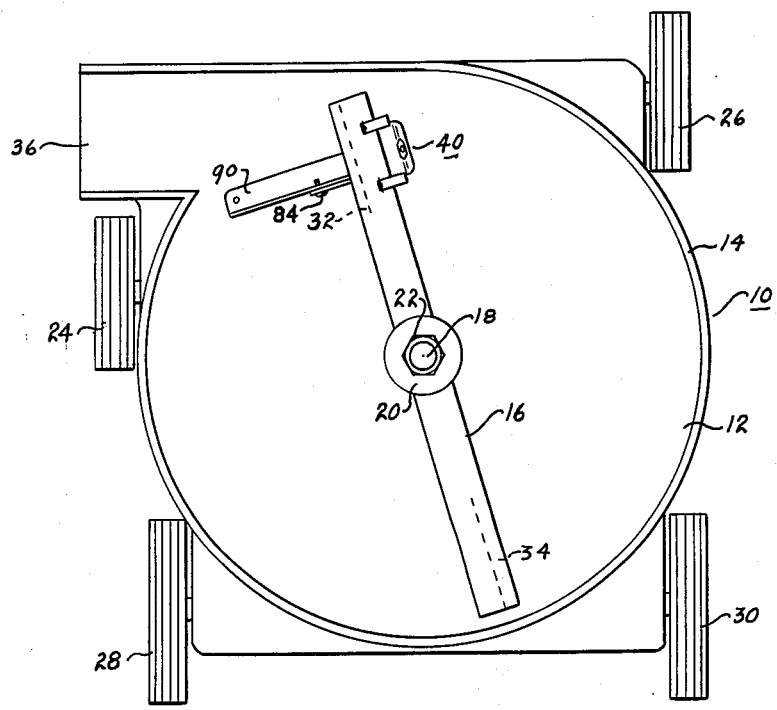
FIGURE 1 is an elevational view of the bottom of a rotary type power mower showing the present sharpening device mounted in operative position on the blade of the mower.
Figure 4:
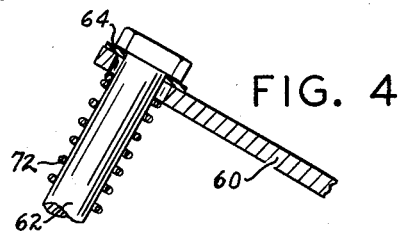
FIGURE 4 is a fragmentary cross sectional view of the sharpening device shown in the preceding figures, the section being taken on line 4—4 of FIGURE 3.

Referring more specifically to the drawings and to FIGURE 1 in particular, numeral 10 designates generally a rotary type power mower, 12 the body of the mower having a peripheral rim 14 enclosing a rotary blade 16 mounted on drive shaft 18 and secured thereto by washer 20 and nut 22. The body is supported on front wheels 24 and 26 and rear wheels 28 and 30, the wheels being either freely rotating or driven by a suitable drive mechanism connected to the mower motor (not shown). Blade 16, having sharpened edges 32 and 34 at opposite ends, is driven through shaft 18 by the motor which may be either an electric motor or a gasoline engine. As the blade is driven by the motor, it rotates in a counterclockwise direction, as viewed in FIGURE 1, the sharpened edges 32 and 34 cutting grass, weeds and the like, which are discharged from body 12 by the force of the blade through discharge opening 36. For the purpose of the present description, the mower 10 is considered as conventional in construction and operation and is representative of a number of different makes now available on the market; consequently, the various parts of the mower will not be described in detail herein.

The present lawn mower sharpening device, generally designated by numeral 40 and shown mounted on mower blade 16, consists of a base 42 having plate 44, and lugs 46 and 48 secured to the underside of plate 44 and each having a slot 50 for receiving the back edge of blade 16, the lugs 46 and 48 being joined rigidly to the underside of plate 44, forming a rigid support for the present device. The base is clamped onto the blade by thumb screws 52 and 54 extending through the lower portion of the respective lugs and engaging the underside of the blade as viewed in FIGURE 2. The two thumb screws retain base 42 firmly on the blade throughout the sharpening operation. In order to assist in obtaining optimum adjustment of the present device, each lug contains a set screw 56 in the upper portion thereof and positioned directly above the respective thumb screw. This set screw may be moved inwardly and outwardly to tilt base 42 longitudinally on blade 16 if it is necessary to do so to obtain the proper angular adjustment of the device on the cutting edge of the blade.

Mounted on base 42 is the sharpening mechanism consisting of an arm 60 pivoted to and supported on plate 44 of the base by a bolt 62 extending through a hole 64 in the upper end of arm 60 and through a hole 66 in one edge of plate 44. In the embodiment of the invention shown in FIGURE 2, the bolt is threaded through hole 66 and locked therein by nut 68 so that the bolt is held rigidly in position with respect to base 42.

Arm 60 is mounted loosely on bolt 62 by having the hole 64 substantially larger than the diameter of bolt 62, so that the arm can tilt downwardly from the position shown in FIGURE 2 into contact with the beveled edge 70 of blade 16. The axial pivoting arrangement of arm 60 on the bolt, i.e. a two-way pivot mounting, is necessary in order for the blade to travel the full length of the beveled edge and effectively perform the sharpening operation. The arm is held against the head of bolt 62 by a coiled spring 72 disposed around bolt 62 and reacting between the upper side of plate 44 and the underside of arm 60 around hole 64, the spring not being of sufficient strength to prevent the arm from tilting downwardly, as viewed in FIGURES 2 and 8, into contact with blade 16.

Arm 60 has an inverted L-shaped cross section formed by members 80 and 82, and secured to the lower edge of member 80 is a metal cutting plate 84 rigidly attached to said member by screws 86 and 88, the blade projecting beyond the lower edge of member 80 sufficiently to effectively engage a cutting edge of blade 16 without any interference from arm 60. Various types of cutting plates or means, including stone or Carborundum, may be used in place of metal plate 84 if desired. Arm 60 extends sufficiently beyond cutting plate 84 to form a handle 90 which can be readily grasped by the operator and used to perform the blade sharpening operation. The handle portion 90 preferably contains a hole 92 which can be used to hang the sharpening device when it is not being used.

Figure 7:
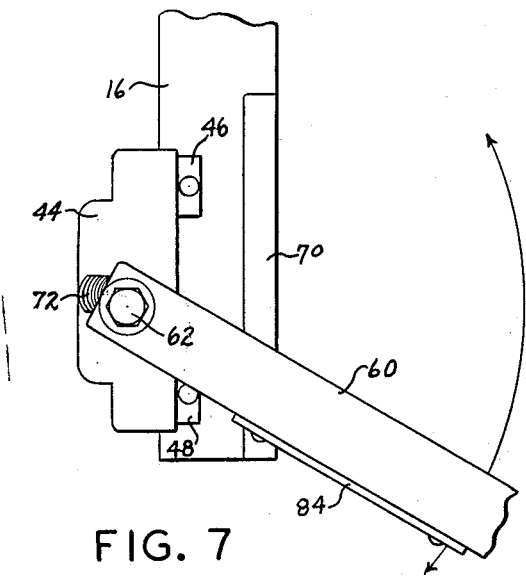
FIGURE 7 is a plan view of the present sharpening device showing the device mounted on one end of the blade on a rotary mower and illustrating the manner in which the device is operated in sharpening the blade.
Figure 5:
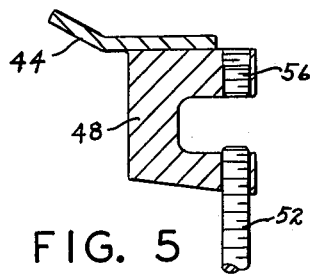
FIGURE 5 is a fragmentary cross sectional view of the present sharpening device, the section being taken on line 5—5 of FIGURE 3.

In the operation of the present sharpening device, the mower is preferably tilted upwardly so that the underside of body 12 and blade 16 are fully exposed, in the manner illustrated in FIGURE 1, and the present device is placed on the blade with the arm between the blade and the inner wall of the mower body. The back edge of the blade is fully seated in slots 50 of the two lugs and thumb screws 52 and 54 are tightened until base 42 is rigidly secured to blade 16. With the device in this position, cutting plate 84 engages the beveled edge 70 of blade 16, as illustrated in FIGURE 8. The operator then swings arm 60 to and fro, as illustrated in FIGURE 7, with cutting plate 84 contacting beveled edge 70 throughout its entire length, inwardly from the end of the blade. The mower blade is preferably held in the position shown in FIGURE 1 with the edge to be sharpened adjacent discharge opening 36 in order to use the larger area at the opening for movement of arm 60. It is seen that as arm 60 is swung throughout its entire operating range, it pivots axially on bolt 62 as well as radially, and the cutting edge of plate 84 sweeps across beveled edge 70 with blade 70 contacted by the edge of plate 84 over a substantial length thereof. The to and fro operation of arm 60 is continued until the edge of blade 16 is adequately sharpened, this often requiring no more than three or four complete cycles of the arm. After the sharpening operation has been completed on the first cutting edge, thumb screws 52 and 54 are loosened and base 42 slipped from the blade 16 and the device removed from the mower, and the device is moved to the other end for sharpening the remaining cutting edge.

It is seen that the present sharpening device is readily assembled on the blade and easily operated and automatically guided to properly sharpen the cutting edge.

One of the particular advantages of the present device is the fact that it can be mounted on most conventional and/or standard rotary type mowers and, since it is clamped rigidly to the blade, little or no difficulty is encountered in retaining the blade 16 stationary and in position where the device can be most effectively operated.

While only one embodiment of the present sharpening device has been described in detail herein, various changes and modifications may be made without departing from the scope of the invention.

I claim:

1. A device for sharpening the blades of rotary lawn mowers, comprising a base, a pair of spaced lugs on said base having slots therein for receiving the back edge of the mower blade, screws for securing the blade in said slots, adjustment screws in said lugs opposite said screws, a bolt secured to said base and extending outwardly therefrom transverse to the blade and having a head on its outer end, an arm loosely pivoted on said bolt and extending transverse of the cutting edge of said blade, a handle on said arm, a coil spring on said bolt reacting between said base and said arm for urging said arm toward said head, and a metal cutting plate secured to said arm for engaging and sharpening the cutting edge of said mower blade as said arm is swung to-and-fro along said edge.

2. A device for sharpening the blades of rotary lawn mowers, comprising a base, a pair of spaced lugs on said base having slots therein for receiving the back edge of the mower blade, screws for securing the blade in said slots, a bolt secured to said base and extending outwardly therefrom transverse to the blade and having a head on its outer end, an arm loosely pivoted on said bolt and extending transverse of the cutting edge of said blade, a coil spring on said bolt reacting between said base and said arm for urging said arm toward said head, and a metal cutting plate secured to said arm for engaging and sharpening the cutting edge of said mower blade as said arm is swung to-and-fro along said edge.

3. A device for sharpening the blades of rotary lawn mowers, comprising a base, a pair of spaced lugs on said base having slots therein for receiving the back edge of the mower blade, screws for securing the blade in said slots, a means secured to said base and extending outwardly therefrom transverse to the blade, an arm pivoted on said last mentioned means and extending transverse of the cutting edge of said blade, and a metal cutting means secured to said arm for engaging and sharpening the cutting edge of said mower blade.

References Cited in the file of this patent
UNITED STATES PATENTS

| | | |
|---|---|---|
| 680,045 | Hopkins | Aug. 6, 1901 |
| 2,193,854 | Benedict | Mar. 19, 1940 |
| 2,826,032 | Hayes | Mar. 11, 1958 |